United States Patent Office 3,422,100
Patented Jan. 14, 1969

3,422,100
S-SUBSTITUTED-THIOACETAMIDO-
CEPHALOSPORINS
Leonard Bruce Crast, Jr., North Syracuse, N.Y., assignor to Bristol-Myers Company, New York, N.Y., a corporation of Delaware
No Drawing. Continuation-in-part of application Ser. No. 607,378, Jan. 5, 1967. This application May 2, 1967, Ser. No. 635,361
U.S. Cl. 260—243       5 Claims
Int. Cl. A61k 21/00

ABSTRACT OF THE DISCLOSURE

This invention relates to certain 7-[α-(substituted-thio)-acetamido]-cephalosporanic acids characterized by a basic nitrogen in its α-substituted side chain, and to the process for the preparation thereof. A typical example would be the reaction of 7-aminocephalosporanic acid with α-bromoacetyl bromide to produce 7-(α-bromoacetamido)-cephalosporanic acid which is further reacted with 2-mercaptopyridine to produce 7-[α-(2-pyridylthio)-acetamido]-cephalosporanic acid.

CROSS REFERENCES TO RELATED APPLICATIONS

This application is a continuation-in-part of our prior co-pending application for Letters Patent entitled "Antibacterial Agents," Ser. No. 607,378, filed on Jan. 5, 1967 and now abandoned.

BACKGROUND OF THE INVENTION (1) Field of the invention.—This invention relates to chemical compounds useful as antibacterial agents in the treatment of infectious diseases caused by gram-positive and gram-negative bacterial in mammals, and particularly in man.

(2) Description of the prior art.—There exists a need to provide alternative and improved agents for the treatment of infections caused by resistant strains of bacteria, e.g., benzylpenicillin resistant strains of *Staphylococcus aureus*, or for the decontamination of objects bearing such organisms, e.g., hospital equipment, etc.

SUMMARY OF THE INVENTION

The 7 - [α - substituted-thioacetamido]-cephalosporanic acids of the present invention are compounds having the formula

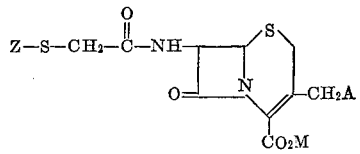

wherein:
Z is a group containing a basic nitrogen capable of forming salts with strong acids, said group being further defined as possessing a pka greater than 2.
A is hydrogen, hydroxyl, (lower)alkanoyloxy, benzoyloxy, a quaternary ammonium radical or, when taken together with M, a monovalent carbon-oxygen bond; and
M is hydrogen, a pharmaceutically acceptable nontoxic cation, an ionic charge when A is the quaternary ammonium radical, or when taken together with A, a monovalent carbon-oxygen bond.

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by gram-positive and gram-negative baceteria and, more particularly, relates to certain 7(α-substituted-thioacetamido)cephalosporanic acids, related salts and derivatives thereof, and to the process for the preparation of same.

Antibacterial agents in the past have proven highly effective in the therapy of infections due to either gram-positive or gram-negative bacteria but few are effective against both. It was the objective of the present invention to provide novel compounds effective against both gram-positive and gram-negative bacteria including resistant strains.

It was a further object of the present invention to provide cephalosporins active against gram-positive and gram-negative bacteria which are also efficiently absorbed upon parenteral or oral administration to man and animals.

The objects of the present invention have been achieved by the provision, according to the present invention, of the compounds of the formula

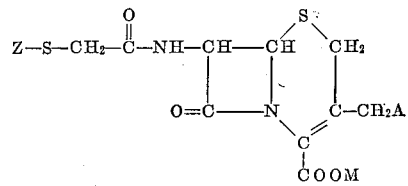

wherein Z is
amino(lower)alkyl,
N-(lower)alkylamino(lower)alkyl,
N,N-di(lower)alkylamino(lower)alkyl,
aminophenyl, aminophenyl(lower)alkyl,
N-(lower)alkylaminophenyl,
N,N-di(lower)alkylaminophenyl,
N-(lower)alkylaminophenyl(lower)alkyl,
N,N-di(lower)alkylaminophenyl(lower)alkyl,
phenylamino(lower)alkyl,
phenyl(lower)alkylamino(lower)alkyl,
substituted phenylamino(lower)alkyl,
substituted phenyl(lower)alkylamino(lower)alkyl,
4-pyridyl or 3-pyridyl, all of which groups are attached to the sulfur atom through a carbon-sulfur bond; said group containing one or more basic nitrogen atoms capable of forming salts with strong acids and said group is further defined as being a radical of ZH, a compound possessing a pka greater than 2.
A is hydrogen, hydroxyl, (lower)alkanoyloxy containing 2 to 8 carbon atoms, e.g., acetoxy, propionoyloxy, butanoyloxy, pentanoyloxy, etc. benzoyloxy, a quaternary ammonium radical, e.g. pyridinium, quinolinium, picolinium, lutidinium, or, when taken together with M; a monovalent carbon-oxygen bond; and M is hydrogen, a pharmaceutically acceptable nontoxic cation, an anionic charge when A is the quaternary ammonium radical, or when taken together with A, a monovalent carbon-oxygen bond.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc. Similarly, where the term "(lower)" is used as part of the description of another group e.g. "(lower)alkoxy," it refers to the alkyl portion of such group which is therefore as described above in connection with "(lower)alkyl" and thus includes such radicals as methoxy, ethoxy, isopropoxy, etc.

For the purpose of clarity the meaning of the term Z is further defined and illustrated below:

Amino(lower)alkyl, N - (lower)alkylamino(lower)alkyl and N,N - di(lower)alkylamino(lower)alkyl are terms descriptive of a group having the formula

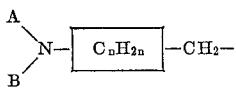

wherein A and B are alike or different and may be hydrogen or (lower)alkyl; $n$ is a whole integer of one to five.

Aminophenyl, aminophenyl(lower)alkyl, N - (lower)alkylaminophenyl, N,N - di(lower)alkylaminophenyl, N - (lower)alkylaminophenyl(lower)alkyl and N,N - di(lower)alkylaminophenyl(lower)alkyl are terms descriptive of a group having the formula

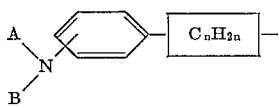

wherein A and B are alike or different and may be hydrogen or (lower)alkyl; $n$ is a whole integer of zero to six.

Phenylamino(lower)alkyl, phenyl(lower) alkylamino(lower)alkyl, substituted phenylamino(lower)alkyl and substituted phenyl(lower)alkylamino(lower)alkyl are terms descriptive of a group having the formula

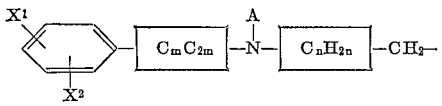

wherein A is hydrogen or (lower)alkyl; $X^1$ and $X^2$ are alike or different and are hydrogen, fluoro, chloro, bromo, (lower)alkyl, (lower)alkoxy, nitro, amino, trifluoromethyl and phenyl; $m$ and $n$ are alike or different and are whole integers of zero to six; or phenyl (lower)alkylamino

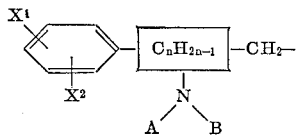

wherein A and B are alike or different and are hydrogen or (lower)alkyl; $X^1$ and $X^2$ are as above; $n$ is a whole integer of two to six.

For illustrative purposes, shown below is the formula of the compound when in Formula I, Z is 4-pyridyl, A is acetoxy and M is H.

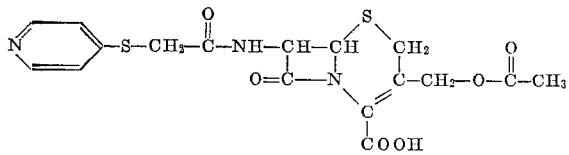

Also for illustrative purposes, shown below is the formulae of the compound when, in Formula I, Z is 4-pyridyl, H is a quaternary ammonium radical (pyridinium) and M is an anionic charge (III) and when A and M together are a monovalent carbon-oxygen bond (IV).

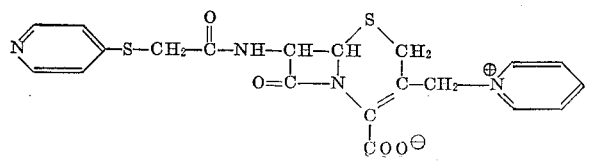

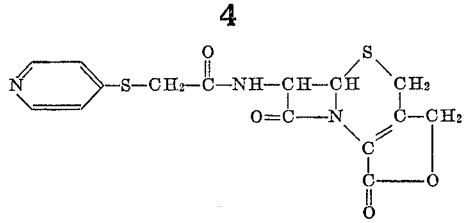

Another preferred group of compounds within the present invention is the group having the formula

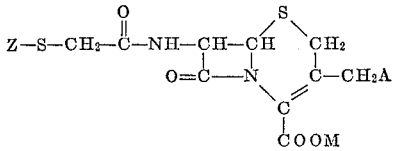

wherein A is hydrogen, hydroxyl, (lower)alkanoyloxy, benzoyloxy, a quaternary ammonium radical or, when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond; and wherein Z is amino(lower)alkyl, N - (lower alkylamino(lower)alkyl, or N,N-di(lower)alkylamino(lower)alkyl.

A more preferred group of compounds within the present invention is the group having the formula

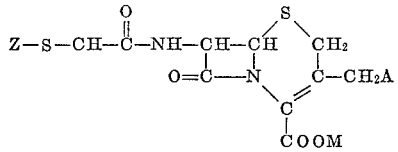

wherein A is hydrogen, hydroxyl, (lower)alkanoyloxy, benzoyloxy, a quaternary ammonium radical or, when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond; and Z is aminophenyl, aminophenyl(lower)alkyl, N-(lower)alkylaminophenyl, N,N-di(lower)alkylaminophenyl, N-(lower) - alkylaminophenyl(lower)alkyl, N,N - di(lower)alkylaminophenyl(lower)alkyl, phenylamino(lower)alkyl, phenyl(lower)alkylamino(lower)alkyl, substituted phenylamino(lower)alkyl or substituted phenyl(lower)alkylamino(lower)alkyl, wherein substituted phenyl is defined as a group having the formula

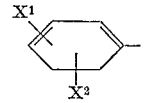

in which $X^1$ and $X^2$ are alake or different and are selected from the group consisting of hydrogen, fluoro, chloro, bromo, (lower)alkyl, (lower)alkoxy, nitro, amino, trifluoromethyl, hydroxy and phenyl.

The most preferred group of compounds within the present invention are those having the formulas:

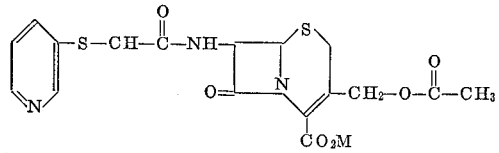

and

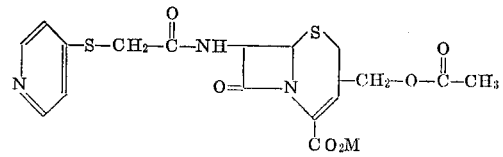

wherein M is a hydrogen, or a nontoxic, pharmaceutically acceptable cation.

The pharmaceutically-acceptable, nontoxic cations include metallic cations such as sodium, potassium, calcium and aluminum and organic amine cations such as trialkylamines, e.g. triethylamine, procaine, dibenzylamine, N-benzyl-β-phenethylamine, 1-ephenamine, N,N'-dibenzylethylenediamine, dehydroabietylamine, N,N'-bis-dehydroabiethylethylenediamine, N-(lower)alkylpiperidines, e.g. N-ethylpiperidine, and other amines which have been used to form salts with benzylpenicillin.

As the compounds of the present invention are by definition capable of forming salts with acids due to their basic nitrogen functions, the compounds are in a sense amphoteric and include the nontoxic acid addition salts thereof (i.e., the amine salts) including the mineral acid addition salts such as the hydrochloride, hydrobromide, hydroiodide, sulfate, sulfamate and phosphate and the oragnic acid addition salts such as the maleate, acetate, citrate, succinate, benzoate, tartrate, fumarate, malate, mandelate, ascorbate and the like.

The compounds of the present invention are prepared by a new and novel two step process. Heretofore it has been common pratcice to acylate 7-aminocephalosporanic acid with an acyl halide or its functional equivalent. This method produces good yields and a high quality product under normal conditions but is not readily conductive to either good yield or high quality product when the acylating agent's side chain contains a basic nitrogen function such as a primary or secondary amine, capable of forming amides. In the preparation of the amine containing acylating agent, it is not at all uncommon for the acyl halide or its functional equivalent to self-condense producing polmeric tars and decomposition product. The two step process of the present invention avoids this problem and produces products in yields that are commercially valuable.

The products of the present invention are prepared in a two-step process:

(1) A compound of the formula

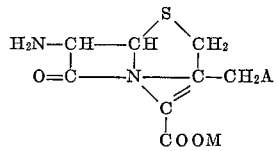

wherein A and M are described above (preferably in the form of a neutral salt such as the sodium salt or the triethylamine salt, i.e., when A is hydrogen, hydroxy, (lower)alkanoyloxy or benzoyloxy) is mixed with an acid halide having the formula

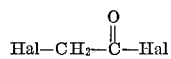

in which Hal is a halogen such as chloro, bromo or iodo or with its functional equivalent as an acylating agent for a primary amino group to produce a compound having the formula VI
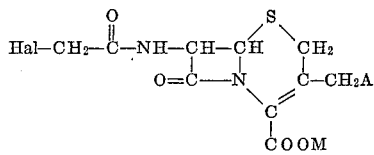

The preferred acylating agent is a haloacetyl halide, most preferably bromoacetyl bromide.

Functional equivalents include the corresponding acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester or thioester (e.g., with p-nitro-phenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI, 6, 360 (1965)] or by the use of enzymes or of an N,N'-carbonyldiimidazole or an N,N'-carbonylditriazole [cf. South African patent specification 63/2,684] of a carbodiimide reagent [especially N,N' - dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065 (1958)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amide nitrogen is a member of a quasi-aromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimdazolides. The by-product, imidazole, precipitates and may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126 and 3,129,224 and British Patents Nos. 932,644, 957,570 and 959,054).

(2) The second step of the process is performed by mixing together material having the Formula VI with a basic nitrogen containing mercaptan having the formula

wherein Z is amino(lower)alkyl,
N-(lower)alkylamino(lower)alkyl,
N,N-di(lower)alkylamino(lower)alkyl,
aminophenyl,
aminophenyl(lower)alkyl,
N-(lower)alkylaminophenyl,
N,N-di(lower)alkylaminophenyl,
N-(lower)alkylaminophenyl(lower)alkyl,
N,N-di(lower)alkylaminophenyl(lower)alkyl,
phenylamino(lower)alkyl,
phenyl(lower)alkylamino(lower)alkyl,
substituted phenylamino(lower)alkyl,
substituted phenyl(lower)alkylamino(lower)alkylamino(lower)alkyl, 4-pyridyl or 3-pyridyl

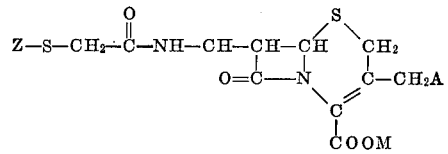

The starting materials used in the present invention include 7-aminocephalosporanic acid and derivatives of 7 - aminocephalosporanic acid. 7 - aminocephalosporanic acid is prepared by hydrolysis of cephalosporin C and has the formula VII
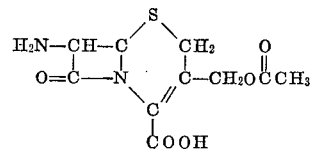

Acid hydrolysis of cephalosporin C to produce 7-aminocephalosporanic acid results in the co-production of the lactone, 3-hydroxymethyl-7-aminodecephalosporanic acid lactone, formed by the further hydrolysis of the acetoxy group and subsequent internal esterification. The lactone has the formula

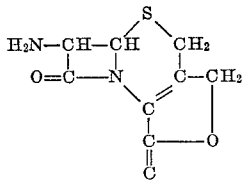

Enzymatic hydrolysis of the acetoxy group of 7-aminocephalosporanic acid results in the formation of 3-hydroxymethyl-7-aminodecephalosporanic acid having the formula

VIII

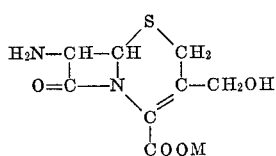

and such compound may be re-esterified with benzoic acid or a lower alkanoic acid, e.g. acetic acid, propionic acid and the like to form other esters. Preferably, re-esterification is carried out on a 3-hydroxymethyl-7-($\alpha$-hydroxy-thienylacetamido)decephalosporanic acid which is obtained by enzymatic hydrolysis of a 7-($\alpha$-hydroxy-thienylacetamido)cephalosporanic acid.

Treatment of cephalosporin C with a tertiary amine, e.g. pyridine, lutidines, picolines and the like, followed by acid hydrolysis produces a nucleus which, in the case of pyridine, has the formula

IX

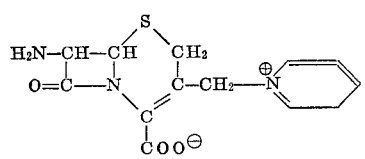

and has been given the name 3-pyridiniummethyl-7-aminodecephalosporanic acid inner salt.

The foregoing nuclei and the preparation thereof are known in the art and are described for example in U.S. Patent No. 3,117,126 and British Patent Nos. 932,644, 957,570 and 959,054.

3-methyl-7-aminodecephalosporanic acid having the formula

X

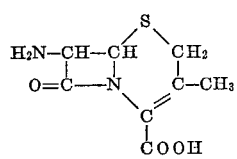

is produced by catalytic reduction of cephalosporin C followed by hydrolytic removal of the 5-aminoadipoyl side chain as described in U.S. Patent No. 3,129,224.

The process for the preparation of the compounds of the instant invention is usually performed by dissolving a one molar quantity of a compound having the Formula VII, VIII, IX or X, in a 2:1 water-acetone solution which is buffered with 3 moles of a bicarbonate.

The solution is rapidly stirred and cooled to 0° C. and one mole of a haloacetyl halide, preferably bromoacetyl bromide, is added rapidly. The temperature is maintained at 0°–5° C. for ten minutes and then stirred for an additional one hour as the temperature is allowed to approach 25° C. The mixture is concentrated in vacuo at 20° C. to about one-half volume and then doubled in volume by the addition of water. Two ether extractions are made and the ether extracts discarded. The aqueous solution is covered by a layer of ethyl acetate or its equivalent, stirred and cooled during which time the solution is acidified to pH 2 by the addition of 40% $H_3PO_4$.

The mixture is filtered and the ethyl acetate layer separated, washed with water, dried over sodium sulfate, filtered, and then treated with a solution of sodium or potassium 2-ethyl-hexanoate (SEH-KEH) in n-butanol. The oil which forms is scratched to induce crystallization. The resultant crystals are collected, washed several times with acetone and dried in vacuo over $P_2O_5$ to yield a sodium or potassium 7 - ($\alpha$-bromoacetamido) - cephalosporanate or derivative of same corresponding to the starting material.

The bromoacetamidocephalosporanate derivative is dissolved in a quantity of water at room temperature and is rapidly stirred during the dropwise addition over a one hour period of a solution composed of equimolar quantities of a basic nitrogen substituted mercaptan and an alkali carbonate, i.e. sodium, potassium, etc. Stirring is continued an additional 90 minutes following which 40% phosphoric acid is added until pH 2.5–3.0 is reached. The product, which usually crystallizes, is collected, then washed with water and ethyl acetate to yield desired material of Formula I.

In the process for the preparation of the compounds of Formulas I and VI above, the compounds are sometimes in aqueous solution in the form of their sodium or potassium salt. These compounds in the aqueous phase can then be converted to the free acid, preferably in the cold under a layer of organic solvent by the addition of mineral acid, e.g. 40% $H_3PO_4$ to pH 2–3. The free acid can then be extracted into a water-immiscible, neutral organic solvent such as ethyl acetate, the extract washed with water quickly in the cold, if desired, and dried, as with anhydrous $Na_2SO_4$ and the free acid recovered from the organic solvent solution. The product in the ethyl acetate extract in its free acid form can then be converted to any desired metal or amine salt, particularly the pharmaceutically acceptable amine salts described above, by treatment with the appropriate base, e.g. a free amine such as procaine base or a solution of potassium 2-ethyl-hexanoate in dry-n-butanol. These salts are usually insoluble in solvents such as ethyl acetate and can be recovered in pure form by simple filtration.

The objectives of the present invention have been achieved, by the provision according to the present invention, of the process for the synthesis of 7-[$\alpha$-(substituted-thio)-acetamido]-cephalosporanic acids which comprises the consecutive steps of:

(a) Mixing together a compound having the formula

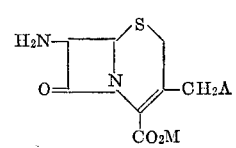

wherein A is hydrogen, hydroxyl, (lower)alkanoyloxy, benzoyloxy, a quaternary ammonium radical, or when taken together with M, a monovalent carbon-oxygen bond; and M is hydrogen, a pharmaceutically acceptable nontoxic cation, an anionic charge when A is a quaternary ammonium radical or, when taken together with A, a monovalent carbon-oxygen bond, with about 1 to 1.5 molar equivalent, but preferably about 1 molar equivalent, of an $\alpha$-haloacetylhalide having the formula

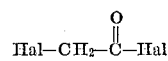

wherein Hal is a halogen selected from the group consisting of chloro, bromo and iodo, but is preferably bromo, or its functional equivalent as an acylating agent for primary amino group in the presence of about 1 to 4.0 molar equivalents, but preferably 2 to 3 molar equivalents of a base selected from the group consisting of alkali metal carbonates and bicarbonates, i.e., NaHCO₃, Na₂CO₃, KHCO₃, K₂CO₃, etc., or pyridine, in a water-water-miscible ketonic solvent system such as water in combination with acetone, methyl isobutylketone (MIBK), butanone, etc., but preferably with acetone, at a temperature of about —20° C. to about 50° C., but preferably in the range of 0° C. to 25° C., to produce a compound having the formula

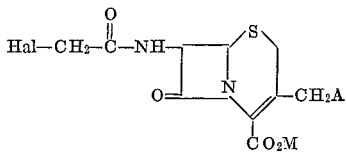

wherein A and M are as described above, and (b) Mixing said α-haloacetamido compound with about 1 to 1.5 molar equivalents, but preferably about 1 molar equivalent, of a mercaptan having the formula

wherein Z is as defined above in the presence of about 1 to 1.5 molar equivalents, but preferably about 1 molar equivalent, of a base selected from the group consisting of an alkali metal hydroxide, bicarbonate and carbonate i.e., NaOH, KOH, Na₂CO₃, K₂CO₃, KHCO₃, NaHCO₃, etc., in an aqueous solvent system at a temperature of about —20° C. to 50° C., but preferably in the range of about 10° C. to about 35° C. to produce a compound having the formula

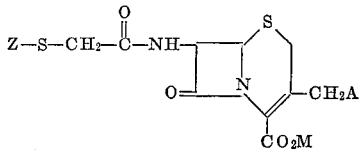

wherein Z, A and M are as described above.

In the treatment of bacterial infections in man, the compounds of this invention are administered orally or parenterally, in accordance with conventional procedures for antibiotic administration, in an amount of from about 5 to 60 mg./kg./day and preferably about 20 mg./kg./day in divided dosage, e.g., three or four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The following examples will serve to illustrate this invention without limiting it thereto. All temperatures are given in degrees Centigrade.

In the examples below, ACA represents the compound having the formula

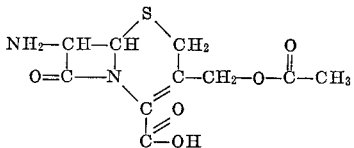

Likewise in the examples that follow, "MIC" represents the Minimum Inhibitory concentration in mcg./ml. of the compound required to inhibit the growth of the test organism described.

DESCRIPTION OF THE PREFERRED EMBODIMENTS

Example 1.—Sodium 7-(α-bromoacetamido)-cephalosporanate

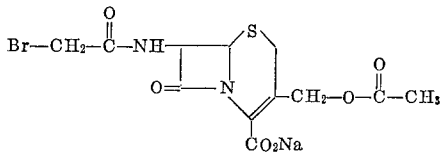

27.2 g. (0.1 mole) of 7-ACA, 33.2 g. (0.3 mole) of NaHCO₃, 200 ml. of water and 100 ml. of acetone were mixed together, cooled to 0° C. and stirred rapidly while 20.1 g. (0.1 mole) of bromoacetyl bromide dissolved in 100 ml. of acetone was added in one fast addition. The temperature was kept at 0°–5° C. for ten minutes, then the ice-salt bath was removed and stirring continued for one hour as the temperature approached 25° C. The mixture was concentrated in vacuo at 20° C. to one-half volume and 200 ml. of water added. Two 400 ml. ether extracts were made and discarded. The aqueous solution was covered with 200 ml. of ethyl acetate and vigorously stirred and cooled while being acidified to pH 2 with 40% phosphoric acid. The mixture was filtered, the ethyl acetate layer separated and washed with three 100 ml. portions of water, dried over Na₂SO₄, filtered and treated with 30 ml. of sodium 2-ethylhexanoate in n-butanol (34 ml.=0.1 mole). The oil which settled out was scratched to induce crystallization. After stirring for 20 minutes the product was scraped from the sides of the flask and collected. The filter cake was washed with several portions of acetone, air dried, and dried in vacuo over P₂O₅. The yield was 22.5 g. and decomposed at 193° C. The infrared (IR) and nuclear magnetic resonance (NMR) spectra were consistent with the above named compound, sodium 7-(α-bromoacetamido)-cephalosporante. (See U.S. Patent 3,173,916.)

*Analysis.*—Calc'd for C₁₂H₁₂BrN₂O S·Na: C, 34.70; H, 2.92. Found: C, 32.43; H, 2.86; H₂O, 0.93%.

7-[α-(2-pyrimidinylthio)acetamido]-cephalosporanic acid monohydrate

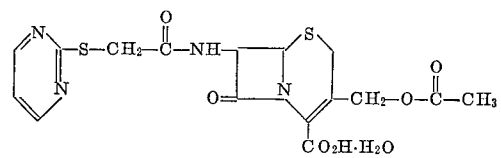

A solution of 1.13 g. (0.01 mole) of 2-mercaptopyrimidine and 1.06 g. (0.01 mole) of sodium carbonate dissolved in 25 ml. of water was added dropwise over a period of an hour at room temperature, to a stirred solution of 4.15 g. (0.01 mole) of sodium 7-(α-bromoacetamido)-cephalosporanate in 25 ml. of water.

Stirring was continued an additional 90 minutes and then 50 ml. of ethyl acetate was added. 40% H₃PO₄ was added dropwise with vigorous stirring until pH 2.5–3 was obtained. The product crystallised immediately and was filtered off, washed several times with water and then three times with 25 ml. portions of ethyl acetate, following which it was air dried. The yield was 2.9 g. of crystals that decomposed at 167°–168° C. The IR and NMR spectra were consistent with the desired product, 7-[α-(2-pyrimidinylthio)acetamido]-cephalosporanic acid monohydrate.

*Analysis.*—Calc'd for C₁₆H₁₆N₄O₆S₂: C, 45.28; H, 3.77; N, 13.21. Found: C, 46.65; H, 3.59; N, 12.90. (Corrected for 5.39% water.)

Example 2.—7-[α-(2-aminophenylthio)-acetamido]-cephalosporanic acid

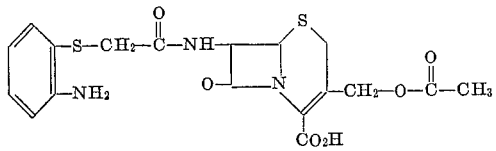

A solution of 1.25 g. (0.01 mole) of 2-aminobenzenethiol and 400 mg. (0.01 mole) of sodium hydroxide in 25 ml. of water was added dropwise over 30 minutes to a stirred solution of 4.15 g. (0.01 mole) of potassium-7-(α-bromoacetamido)-cephalosporanate in 25 ml. of water at 22° C. After an additional 30 minutes of stirring, 50 ml. of ethyl acetate was added and the pH adjusted to 3 by the addition of 40% $H_3PO_4$. The ethyl acetate layer was separated, washed once with 20 ml. of water, dried over $Na_2SO_4$ for 10 minutes, filtered and scratched to induce crystallization. Concentration of the solvent by slow evaporation was allowed to occur, following which the product was collected, washed with ethyl acetate and air-dried. After drying for 2 hours at 0.2 mm. Hg over $P_2O_5$ there was obtained 2 g. of crystalline material, decomposition point 115° C. The IR and NMR spectra were consistent with the desired product, 7[α-(2-aminophenylthio)-acetamido]-cephalosporanic acid.

*Analysis.*—Calc'd for $C_{18}H_{19}N_3O_6S_2$: C, 49.93; H, 4.39; N, 9.61. Found: C, 49.16; H, 4.72; N, 8.95.

Example 3.—7-[α-(4-pyridylthio)-acetamido]-cephalosporanic acid

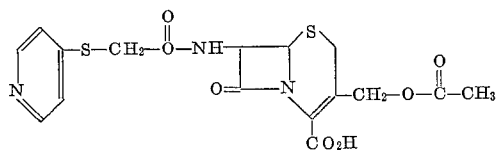

To a stirred solution of 4.15 g. (0.01 mole) sodium 7-(α-bromoacetamido)-cephalosporanate and 0.84 g. (0.01 mole) of $NaHCO_3$ in 25 ml. of water was added 1.1 g. (0.01 mole) of 4-mercaptopyridine. Vigorous carbon dioxide evolution occurred. After ten minutes, the pH was adjusted to pH 2 with 40% $H_3PO$ and one 25 ml. ethyl acetate extract was made and discarded. The aqueous solution was then extracted with a solution of 4.44 g. (0.01 mole) of "aerosol OT" (a long chain alkylaminesulfonic acid) in 50 ml. of methyl isobutyl ketone (MIBK). The MIBK extract was washed once with 25 ml. of water and then dried ten minutes over $Na_2SO_4$. The filtered MIBK solution was then diluted to about 100 ml. with MIBK washes of the $Na_2SO_4$ filter cake. The solution was concentrated in vacuo at 20° C. to a volume of about 50 ml. and then 1.4 ml. (0.01 mole) of triethylamine was added with stirring. The precipitated product was collected and washed thoroughly with MIBK, dry ether, acetone and finally "Skellysolve B." The crystalline material weighed 1.5 g. and its IR and NMR spectra were consistant with the structure of the desired product, 7-[α-(4-pyridylthio) - acetamido] - cephalosporanic acid. M.I.C. vs. *Diplococcus pneumoniae* plus 5% serum (dissolved in dilute aqueous sodium bicarbonate) was 0.062 mcg./ml.

Example 4.—7-[α-(4-aminophenylthio)-acetamido]-cephalosporanic acid

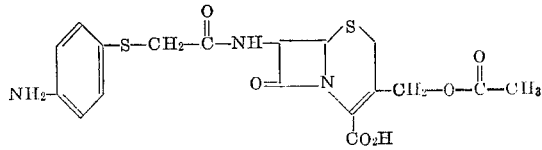

Substitution in the procedure of Example 1 for the 2-mercaptopyrimidine used therein of 4-aminophenylenethiol produces 7-[α-(4-aminophenylthio) - acetamido]-cephalosporanic acid, decomposition point 136° C.

Example 5.—7-[α-(3-pyridylthio)-acetamido]-cephalosporanic acid

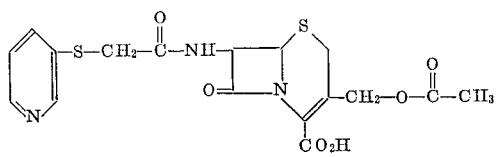

Substitution in the procedure of Example 3 for the 4-mercaptopyridine used therein of 3-mercaptopyridine produces 7-[α-(3-pyridylthio)acetamido]-cephalosporanic acid, decomposition point 163° C.

Example 6.—7-[α-(4-dimethylaminophenylthio)-acetamido]-cephalosporanic acid

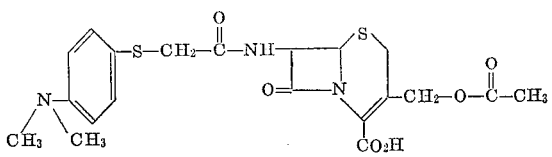

Substitution in the procedure of Example 2 for the 2-aminobenzenethiol used therein of 4-dimethylaminobenzenethiol produces 7-[α-(4-dimethylaminophenylthio)-acetamido]-cephalosporanic acid.

Example 7.—7-[α-(2-((4-fluoroanilino))-ethylthio)-acetamido]-cephalosporanic acid

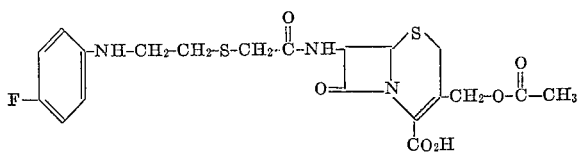

Substitution in the procedure of Example 2 for the 2-aminobenzenethiol used therein of 2-(4-fluoro-anilino)-ethanethiol produces 7-[α-(2-((fluoroanilino)) - ethylthio)-acetamido]-cephalosporanic acid.

Example 8.—7-[α-(2-aminoethylthio)-acetamido]-cephalosporanic acid

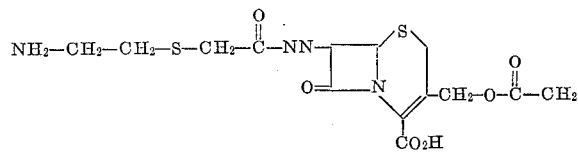

Substitution in the procedure of Example 1 for the 2-mercaptopyrimidine used therein of 2-aminoethanethiol produces 7-[α-(2-aminoethylthio)-acetamido] - cephalosporanic acid.

Example 9.—7-[α-(2-((benzylamino))-ethylthio)-acetamido]-cephalosporanic acid

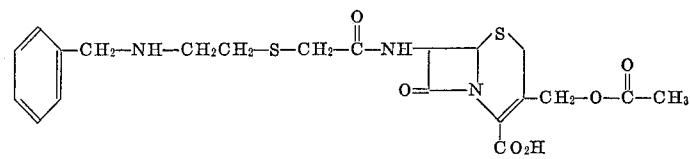

Substitution in the procedure of Example 2 for the 2-aminobenzenethiol used therein of 2-benzylaminoethanethiol produces 7-[α-(2-((benzylamino))-ethylthio)-acetamido]-cephalosporanic acid.

Example 10.—7-[α-(2-((n-butylamino))-ethylthio)-acetamido]-cephalosporanic acid

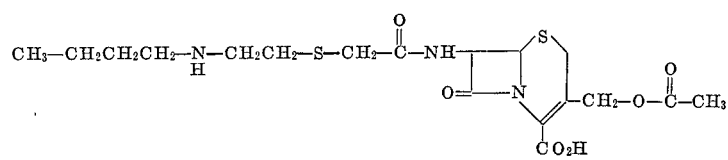

Substitution in the procedure of Example 2 for the 2-aminobenzenethiol used therein of 2-n-butylaminoethanethiol produces 7-[α-(2-((n-butaylamino))-ethylthio)-acetamido]-cephalosporanic acid.

Example 11.—7-[α-(2-methylaminophenylthio)-acetamido]-cephalosporanic acid

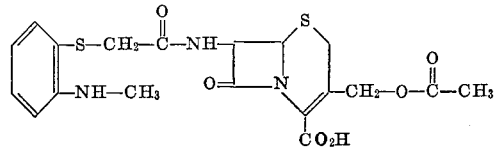

Substitution in the procedure of Example 3 for the thiol used therein of 2-methylaminobenzenethiol produces 7 - [α - (2 - methylaminophenylthio) - acetamido] - cephalosporanic acid.

Example 12

Substitution in the procedure of Example 3 for the thiol used therein of N-methylaminoethanethiol, N,N-dimethylaminoethanethiol, N-ethylaminoethanethiol, N,N-diethylaminoethanethiol, etc., produces the corresponding α-substituted thioacetamidocephalosporanic acid.

Example 13.—7-[α-(2-((aminophenyl))-ethylthio)-acetamido]-cephalosporanic acid

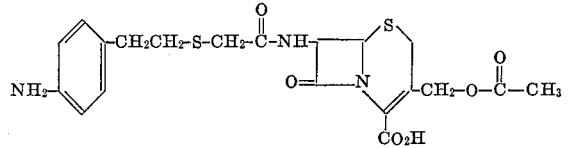

Substitution in the procedure of Example 2 for the 2-aminobenzenethiol used therein of p-aminophenylethanethiol produces 7-[α-(2-((aminophenyl))-ethylthio-acetamido]-cephalosporanic acid.

Example 14.—7-[α-(2-((N-methylanilino))ethylthio)-acetamido]-cephalosporanic acid

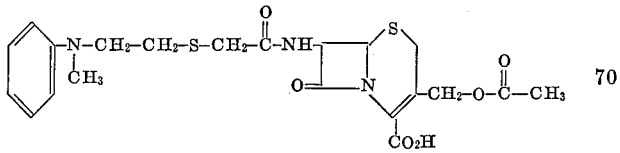

Substitution in the procedure of Example 2 for the 2-aminobenzenethiol used therein of 2-(N-methylanilino)-ethanethiol produces 7-[α-(2-((N-methylanilino))ethylthio)-acetamido]-cephalosporanic acid.

Example 15.—7-[α-(α-((dimethylaminomethyl))-benzylthio)-acetamido]-cephalosporanic acid

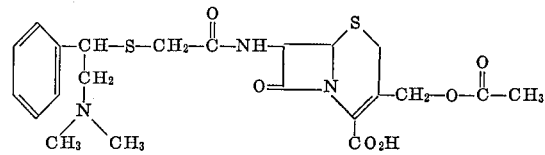

Substitution in the procedure of Example 2 for the 2-aminobenzenethiol used therein of α-(dimethylaminomethyl)-benzylthiol produces 7-[α-(α-((dimethylaminomethyl))-benzylthio)-acetamido]-cephalosporanic acid.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A compound having the formula

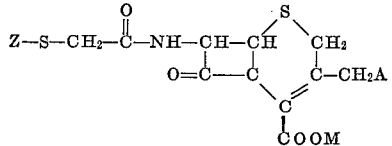

wherein A is hydrogen, hydroxyl, acetoxy, benzoyloxy, a quaternary ammonium radical or, when taken together with M, a monovalent carbon-oxygen bond; and M is hydrogen, a pharmaceutically acceptable nontoxic cation, an anionic charge when A is a quarternary ammonium radical as defined above or, when taken together with A, a monovalent carbon-oxygen bond; and wherein Z is amino(lower)alkyl, N-(lower)alkylamino(lower)alkyl, or N,N-di(lower)alkylamino(lower)alkyl.

2. A compound having the formula

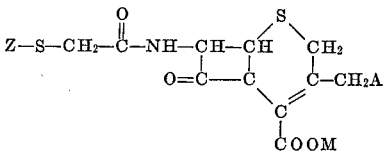

wherein A is hydrogen, hydroxyl, acetoxy, benzoyloxy, a quaternary ammonium radical or, when taken together with M, a monovalent carbon-oxygen bond; and M is hydrogen, a pharmaceutically acceptable nontoxic cation, an anionic charge when A is a quaternary ammonium radical as defined above or, when taken together with A, a monovalent carbon-oxygen bond; and Z is aminophenyl, aminophenyl(lower)alkyl, N-(lower)alkylaminophenyl, N,N-di(lower)alkylaminophenyl, N-(lower)alkylaminophenyl(lower)alkyl, N,N-di-(lower)alkylaminophenyl(lower)alkyl, phenylamino(lower)alkyl, phenyl(lower)alkylamino(lower)alkyl, substituted phenylamino(lower)alkyl or substituted phenyl(lower)alkylamino(lower)alkyl, wherein substituted phenyl is defined as a group having the formula

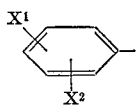

in which $X^1$ and $X^2$ are alike or different and are selected from the group consisting of hydrogen, fluoro, chloro, bromo, (lower)alkyl, (lower)alkoxy, nitro, amino, trifluoromethyl and phenyl.

3. A compound having the formula

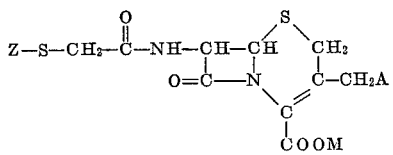

wherein A is hydrogen, hydroxyl, acetoxy, benzoyloxy, a quaternary ammonium radical of the formula

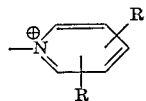

wherein R and R are each hydrogen or methyl or, when taken together with M, a monovalent carbon-oxygen bond; and M is hydrogen, a pharmaceutically acceptable nontoxic cation, an anionic charge when A is a quaternary ammonium radical as defined above or, when taken together with A, a monovalent carbon-oxygen bond; and Z is 4-pyridyl or 3-pyridyl.

4. A compound of claim 3 having the formula

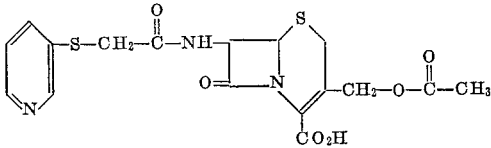

and the nontoxic, pharmaceutically acceptable salts thereof.

5. A compound of claim 3 having the formula

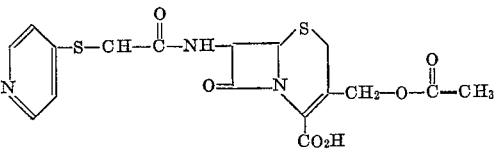

and the nontoxic, pharmaceutically acceptable salts thereof.

References Cited

UNITED STATES PATENTS 3,335,136  8/1967  Flynn _____ 260—243

NICHOLAS S. RIZZO, *Primary Examiner.*

DONALD C. DAUS, *Assistant Examiner.*

U.S. Cl. X.R.

260—294.8, 609, 622, 309, 308, 247.7, 307, 310, 544

UNITED STATES PATENT OFFICE
CERTIFICATE OF CORRECTION

Patent No. 3,422,100                              January 14, 1969

Leonard Bruce Crast, Jr.

It is certified that error appears in the above identified patent and that said Letters Patent are hereby corrected as shown below:

Column 2, lines 20 to 29, the formula should be numbered -- I --. Column 3, lines 56 to 62, the formula should be numbere -- II --; lines 69 to 75, the formula should be numbered -- III --. Column 4, lines 1 to 8, the formula should be numbered -- IV --; lines 29 to 34, the portion of the formula reading "Z-S-CH-" should read -- Z-S-$CH_2$- --; same column, lines 51 to 54, the formula should appear as shown below:

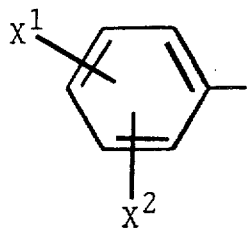

same column, line 56, "alake" should read -- alike --; lines 62 to 67, the portion of the formula reading "-S-CH-" should read -- -S-$CH_2$- --. Column 5, line 24, "pratcice" should read -- practice --; line 27, "conductive" should read -- conducive --; lines 41 to 47, the formula should appear as shown below:

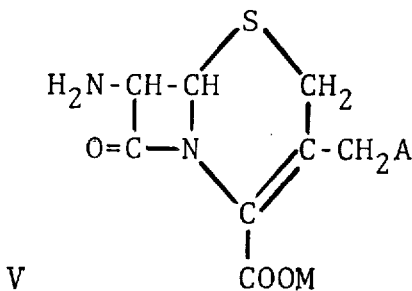

Column 6, line 5, "XXI,6,360" should read -- XXI/6,360 --; line 57, after "pyridyl" insert -- to produce compounds of the formula I --; lines 58 to 63, the portion of the formula reading

     should read     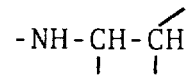

same column 6, lines 70 to 75, the portion of the formula reading

     should read     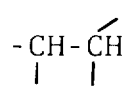

Column 7, lines 19 to 26, the portion of the formula reading

COOM should read

COOH same column 7, lines 38 to 44, the right-hand portion of the formula should appear as shown below:

Column 10, line 42, "C H BrN O S·Na:" should read
            12 12    2

-- $C_{12}H_{12}BrN_2O_6S \cdot Na$: --; line 65, "crystallised" should read

-- crystallized --. Column 12, lines 62 to 71, the portion of the formula reading

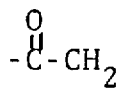

should read

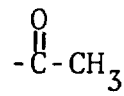

Column 13, line 30, "((n-butaylamino))" should read -- ((n-butylamino)) --. Column 14, lines 50 and 70, after "a quaternary ammonium radical", each occurrence insert -- of the formula

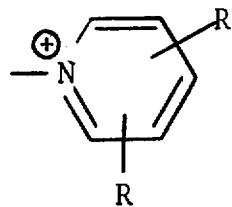

same column 14, lines 62 to 68, the portion of the formula reading

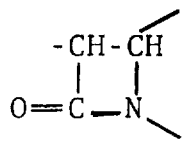

should read

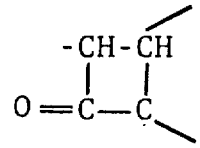

Column 16, lines 20 to 25, the portion of the formula reading $-S-CH-\overset{\overset{O}{\|}}{C}-$ should read $-S-CH_2-\overset{\overset{O}{\|}}{C}-$ Signed and sealed this 31st day of March 1970.

(SEAL)
Attest:

EDWARD M. FLETCHER, JR.
Attesting Officer

WILLIAM E. SCHUYLER, JR
Commissioner of Patents